(12) United States Patent
Kaneko (10) Patent No.: US 8,027,060 B2
(45) Date of Patent: Sep. 27, 2011

(54) TONE EVALUATION APPARATUS AND TONE EVALUATION METHOD

(75) Inventor: Chiaki Kaneko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 12/055,786

(22) Filed: Mar. 26, 2008

(65) Prior Publication Data

US 2008/0239349 A1    Oct. 2, 2008

(30) Foreign Application Priority Data

Mar. 30, 2007    (JP) .................................. 2007-093415

(51) Int. Cl.
*G06F 15/00* (2006.01)
*H04N 1/46* (2006.01)
*G06K 9/00* (2006.01)

(52) U.S. Cl. ........................ 358/1.9; 358/525; 382/162

(58) Field of Classification Search .................. None
See application file for complete search history.

(56) References Cited

U.S. PATENT DOCUMENTS

| | | | | | |
|---|---|---|---|---|---|
| 5,619,427 | A | * | 4/1997 | Ohkubo | 358/523 |
| 5,644,509 | A | * | 7/1997 | Schwartz | 358/518 |
| 5,809,213 | A | * | 9/1998 | Bhattacharjya | 358/1.6 |
| 6,178,007 | B1 | * | 1/2001 | Harrington | 358/1.9 |
| 6,204,930 | B1 | * | 3/2001 | Inoue | 358/1.9 |
| 7,379,204 | B2 | * | 5/2008 | Fukao | 358/1.9 |
| 7,593,147 | B2 | * | 9/2009 | Okamoto et al. | 358/518 |
| 7,760,400 | B2 | * | 7/2010 | Ishii et al. | 358/3.22 |
| 7,864,362 | B2 | * | 1/2011 | Yoshida | 358/1.9 |
| 2002/0067847 | A1 | * | 6/2002 | Maltz et al. | 382/162 |
| 2002/0136446 | A1 | * | 9/2002 | Slavin | 382/162 |
| 2004/0263882 | A1 | * | 12/2004 | Ito et al. | 358/1.9 |
| 2005/0271274 | A1 | * | 12/2005 | Urano et al. | 382/173 |
| 2007/0127074 | A1 | * | 6/2007 | Hayaishi | 358/3.01 |
| 2007/0195346 | A1 | * | 8/2007 | Fuji | 358/1.9 |
| 2008/0018918 | A1 | * | 1/2008 | Ozaki et al. | 358/1.9 |

FOREIGN PATENT DOCUMENTS

JP    A 2005-174133    6/2005

* cited by examiner

*Primary Examiner* — Twyler Haskins
*Assistant Examiner* — Barbara Reinier
(74) *Attorney, Agent, or Firm* — Fitzpatrick, Cella, Harper & Scinto (57) ABSTRACT

A tone evaluation method acquires color information on the second color space of a patch image corresponding to a grid point in the first color space, and calculates as the feature amount of a color conversion table the variation of the color information between two grid points in the first color space. Then, on the basis of the feature amount, a tone evaluation value for the color conversion table is calculated. In addition, on the basis of the variation of the feature amount, a tone jump position in the color conversion table is extracted and displayed.

13 Claims, 9 Drawing Sheets

TONE EVALUATION APPARATUS AND TONE EVALUATION METHOD

BACKGROUND OF THE INVENTION

1. Field of the Invention

The present invention relates to a tone evaluation apparatus and tone evaluation method of evaluating the tone in a color conversion table for converting image data on the first color space into data on the second color space.

2. Description of the Related Art

One of the important factors that determine image quality is the tone of an image. For example, when a color image is on an L*a*b* space, its tone has a three-dimensional distribution. For this reason, in order to evaluate the performance of a color image forming apparatus, it is very important to evaluate the tone of an image in a three-dimensional space.

As a method of evaluating the tone of an image in a three-dimensional space, there is proposed a method of performing so-called objective evaluation for an image output by a color image forming apparatus or the like (see, e.g., Japanese Patent Laid-Open No. 2005-174133). According to this image evaluation method, a gradation image is read, color information such as lightness, chroma, and hue are acquired, and then correction considering the human visual characteristics is applied to the color information.

Subsequently, the difference of the corrected color information between the neighboring pixels of the gradation image is calculated, and the difference is compared with a threshold to calculate a tone jump position and a tone jump amount on the gradation image. Furthermore, the accumulated value of the acquired tone jump amounts for the entire gradation image is calculated as a tone evaluation value.

With the above-described processing, a tone evaluation value for at least one color information can be calculated, or the weighted sum of tone evaluation values acquired for two or more pieces of color information can be calculated as an overall evaluation value.

In the tone evaluation method described in Japanese Patent Laid-Open No. 2005-174133, however, only the color space reproduced on the output gradation image can be evaluated.

Generally, a color image forming apparatus converts input image data on the first color space (e.g., RGB) into data on the second color space (e.g., L*a*b*) as a uniform color space so as to perform various processes. In addition, the image data which underwent processing on the second color space is converted into data on the third color space (e.g., CMYK) for output. In so-called color conversion processing for conversion between color spaces, a color conversion table is used. Since the content of the color conversion table influences the quality of a formed image, it is necessary to evaluate tone reproduction by the color conversion table.

When the tone evaluation method described in Japanese Patent Laid-Open No. 2005-174133 is to be applied to a color conversion table, it is necessary to output a gradation image which covers the whole color space reproducible using the color conversion table. Furthermore, in order to detect a tone jump position, it is necessary to output a gradation image which surely includes the tone jump. However, it is difficult to generate such a gradation image. In addition, since a tone jump position calculated by the tone evaluation method described in Japanese Patent Laid-Open No. 2005-174133 is presented as a position on the gradation image, it is difficult to pinpoint that portion of the conversion table, which has a problem.

The present invention has been made to solve the above-described problems, and has as its object to provide a tone evaluation apparatus and tone evaluation method comprising the following functions. That is, for a color conversion table used when performing color conversion from the first color space to the second color space, a tone in the entire area of an available gamut is easily and appropriately evaluated. In addition, a tone jump position on the color conversion table is effectively specified.

SUMMARY OF THE INVENTION

As a technique for achieving the above-described object, a tone evaluation apparatus of the present invention comprises the following components.

According to one aspect of the present invention, there is provided a tone evaluation apparatus which evaluates a tone reproduced using a color conversion table for converting image data on a first color space into image data on a second color space, the apparatus comprising:

an acquisition unit adapted to acquire color information on the second color space for each grid point in the first color space;

a calculation unit adapted to calculate a tone evaluation value for the color conversion table on the basis of a variation of the color information between the grid points in the first color space; and an evaluation unit adapted to evaluate a tone, reproduced using the color conversion table, on the basis of the tone evaluation value.

As has been described above, according to the present invention, it is possible to easily and appropriately evaluate the tone in the entire area of an available gamut, for a color conversion table used when performing color conversion from the first color space to the second color space. In addition, a tone jump position on the color conversion table can be effectively specified.

Further features of the present invention will become apparent from the following description of exemplary embodiments (with reference to the attached drawings).

DESCRIPTION OF THE EMBODIMENTS

The present invention will be described in detail on the basis of preferred embodiments with reference to the accompanying drawings. Arrangements set forth in the following embodiments are merely examples, and the present invention is not limited to illustrated arrangements.

First Embodiment

In this embodiment, tone reproduction is evaluated for a color conversion table which is used when performing color conversion from the first color space to the second color space.

Figure 1:
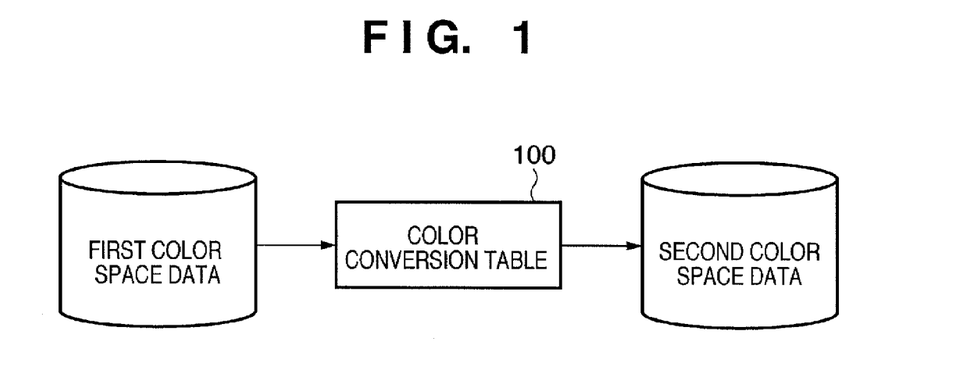
FIG. 1 is a view showing an outline of the processing of a color conversion table in one embodiment according to the present invention.

An outline of the operation of a tone evaluation system in this embodiment will be described. As shown in FIG. 1, a color conversion table 100, which is a tone evaluation target in this embodiment, inputs image data expressed on the first color space, converts the image data into that expressed on the second color space, and outputs the converted image data. The color conversion table 100 can take the form of an LUT, matrix, or the like. The color conversion table 100 is described as an LUT in this embodiment.

If the color conversion table 100 is looked up when converting input image data into data on a uniform color space, the first color space is, e.g., a three-dimensional RGB space and the second color space is, e.g., a three-dimensional CIE-L*a*b* or XYZ space which is independent of the first color space. If the color conversion table 100 is looked up when converting image data processed on a uniform color space into data on a printer output color space, the first and second color spaces are as follows. That is, the first color space is, e.g., a three-dimensional L*a*b* or XYZ space, and the second color space is, e.g., a three-dimensional CMY space which corresponds to the colors of color materials mounted on a printer. In this case, the second color space may be a four-dimensional CMYK space which corresponds to the colors of the color materials of the printer. Note that the first and second color spaces in this embodiment are not limited to those described above. Other color spaces such as a CIECAM color space can be applicable as long as they can be expressed on a multidimensional space of three or more dimensions. In the following description, it is assumed that the first color space is an RGB space and the second color space is an L*a*b* space.

Figure 2:
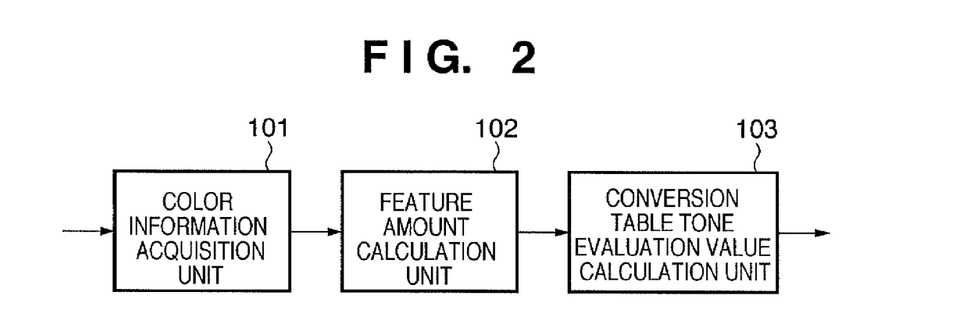
FIG. 2 is a block diagram showing an outline of the functional arrangement of a tone evaluation system in the embodiment.

FIG. 2 is a block diagram showing an outline of the functional arrangement of the tone evaluation system of this embodiment. In FIG. 2, reference numeral 101 denotes a color information acquisition unit which acquires the second color space color information of a patch image generated by dividing the first color space in a grid pattern with a given number of steps. In this case, color information is, for example, lightness, chroma, or hue acquired by measuring the color of a patch image to which the color conversion table 100 was applied. Reference numeral 102 denotes a feature amount calculation unit which calculates the difference of the color information acquired by the color information acquisition unit 101 between neighboring grid points, as a feature amount of the color conversion table 100. Reference numeral 103 denotes a conversion table tone evaluation value calculation unit which calculates the tone evaluation value of the color conversion table on the basis of the feature amount of the color conversion table 100 calculated by the feature amount calculation unit 102.

Figure 3:
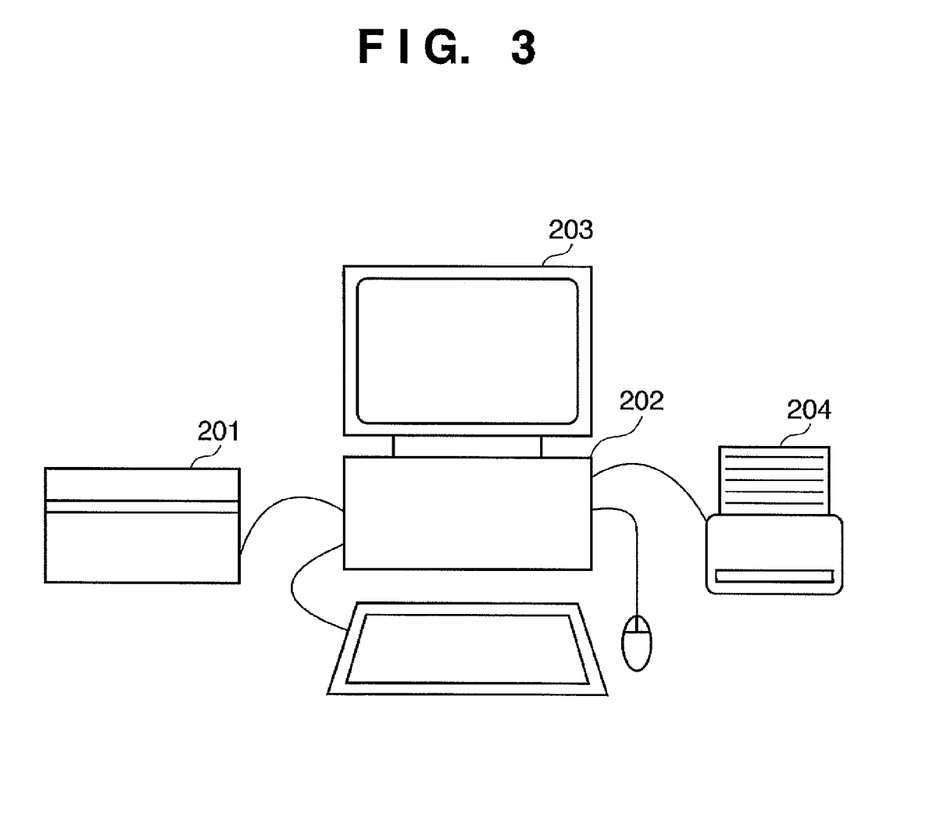
FIG. 3 is a view showing the outer appearance of the tone evaluation system in the embodiment.

FIG. 3 is a view showing the outer appearance of the tone evaluation system in this embodiment. In FIG. 3, reference numeral 201 denotes a spectrophotometer as an image signal input device. Reference numeral 202 denotes a personal computer (to be referred to as a PC, hereinafter) as a computer system. The PC 202 can input an image signal read by the spectrophotometer 201 and edit/store it. The PC 202 further holds a color conversion table to be evaluated in this embodiment. The PC 202 performs color conversion processing for the acquired image signal by using the color conversion table 100, and then performs various types of image processing. The image signal as the processing result can be displayed on a display 203 or printed out from a color printer 204.

Figure 4:
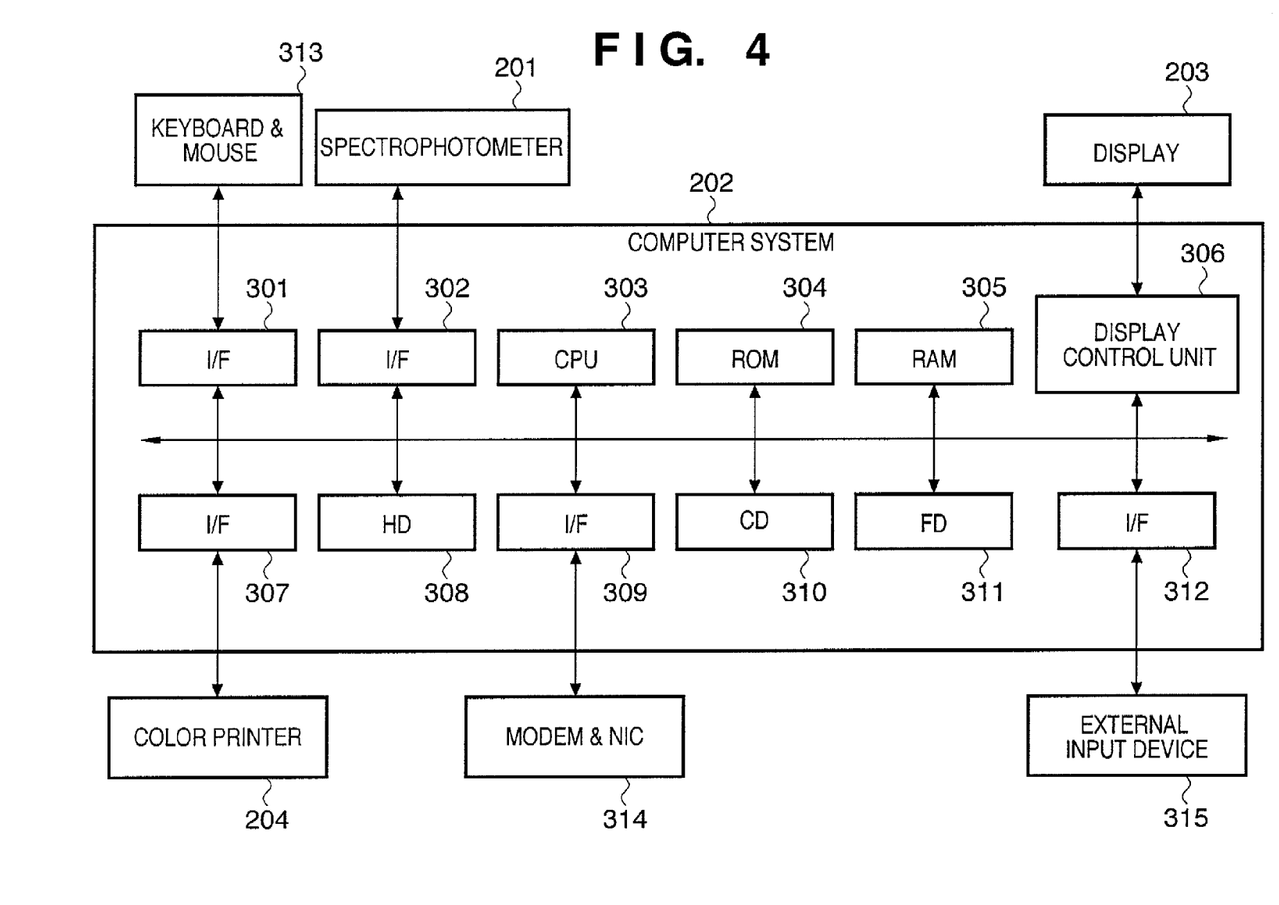
FIG. 4 is a block diagram showing the arrangement of the tone evaluation system in the embodiment.

FIG. 4 is a block diagram showing the arrangement of the tone evaluation system shown in FIG. 3. In FIG. 4, the same components as those in FIG. 3 described above are denoted by the same reference numerals. In FIG. 4, reference numeral 313 denotes a user input device such as a mouse or keyboard for inputting various types of manual instructions by a user. The user input device 313 is connected to an interface (I/F) 301 in the PC 202. Reference numeral 314 denotes a transmission device such as a modem or NIC for transmitting various data held in the respective parts in the PC 202 to an external device and receiving various data from the external device. The transmission device 314 is connected to an I/F 309 in the PC 202. Reference numeral 315 denotes an external input device which enables data input from an external apparatus by using a USB, IEEE1394, or the like. The external input device is connected to an I/F 312 in the PC 202.

In the PC 202, reference numeral 302 is an interface (I/F) for connecting an image input device such as the spectrophotometer 201 to the PC 202. Reference numeral 303 denotes a CPU which controls the operation of each block in the PC 202 or executing a program stored in the PC 202. Reference numeral 304 denotes a ROM for storing a required image processing program or the like in advance. Reference numeral 305 denotes a RAM for temporality storing a program or image data to be processed for processing in the CPU 303. Reference numeral 306 denotes a display control unit which controls the display 203 on which an image to be processed and a message to the operator are displayed.

Reference numeral 307 denotes an interface (I/F) for connecting the color printer 204 to the PC 202. Reference numeral 308 denotes a hard disk (HD) which can store in advance a program or image data to be transferred to the RAM 305 or the like or save processed image data. Reference numeral 309 denotes an interface (I/F) which connects the PC 202 and the transmission device 314 such as a modem or network card that enables transmission of various data held in the respective parts in the PC 202 to an external device or reception of various data from an external device. Reference numeral 310 denotes a CD drive which enables reading of data stored in a CD (e.g., CD-R, CD-RW, or DVD) as one of external storage media, or writing of data in such a medium. Reference numeral 311 denotes an FD drive which enables reading/writing from/in an FD, like the CD drive 310. Note that when an image editing program, printer information, or the like is stored in, e.g., a CD, FD, or DVD, the program is installed onto the HD 308 and transferred to the RAM 305, as needed. Reference numeral 312 denotes an interface (I/F) to which the external input device 315 that enables data input by using a USB, IEEE1394, or the like is connected so as to enable data input from an external device.

The color conversion table 100 to be evaluated in this embodiment is held in, e.g., the RAM 305. The color conversion table 100 may be stored in the HD 308 in advance and read onto the RAM 305 upon executing color conversion processing.

A tone evaluation process in the system of this embodiment with the above-described arrangement will now be described with reference to the flowchart shown in FIG. 5. That is, this embodiment is practiced by storing a program which describes the procedure shown in the flowchart in FIG. 5 in the ROM 304 in advance and executing the stored program by the CPU 303. Note that a program stored in the HD 308 in advance may be read onto the RAM 305 and executed by the CPU 303.

In step S401, a patch image is output. More specifically, grid points are acquired by dividing each of R, G, and B components forming the first color space with a given number of steps, and the respective grid points are output via the color conversion table 100 onto a printing medium by the color printer 204. In this case, dividing with a given number of steps means that, for example, in an 8-bit RGB space, R, G, and B signal values are respectively divided into eight equal parts, and then patches of 512 colors are generated from the combinations of the divided R, G, and B signal values. Note that the signal value need not be divided into equal parts. A highlight portion may be divided with a larger number of steps. Alternatively, any number of steps between 3 (inclusive) and 255 (exclusive) can be used in case of an 8-bit processor. In this embodiment, the patch image is exemplified by an RGB signal value, but the patch image is of course not limited to this. Three-dimensional XYZ value or four-dimensional CMYK signal value may be used, as long as it corresponds to the first color space. Also, this embodiment has exemplified a case wherein the patch is output via the PC 202. However, a signal generator (not shown) or the like may be connected directly to the color printer 204 to output the patch. Furthermore, patch data may be stored in the HD 308, CD drive 310, or FD drive 311, or may be acquired via the transmission device 314 or external input device 315.

The information and signal values of the grid points in the first color space determined for patch output are stored in the RAM 305. However, when the data amount is large, the HD 308 or the like is also utilized.

In step S402, the color of the patch image is measured. More specifically, the color of the patch output in step S401 is measured using the spectrophotometer 201. This color measurement is performed on an L*a*b* space as the second color space.

In step S403, the color measurement values of the respective patches measured in step S402 are input to the PC 202 as color information. More specifically, the color measurement values are stored in the RAM 305 in correspondence with the respective patch signal values stored in step S401. When the data amount is large, the HD 308 or the like is also utilized.

The processing in steps S401 to S403 described above corresponds to the processing in the color information acquisition unit 101.

In step S404, for all the patch signal values stored in step S401, curvatures are calculated as the feature amount of the LUT on the basis of the corresponding color measurement values stored in step S403. In this case, the curvature is a parameter that indicates the bending degree of a curve. The sharper the curve bends, the larger its curvature.

A curvature calculation method in this embodiment will be described more specifically with reference to FIG. 6. In the following description, a point having a patch signal value $(r_i, g_j, b_k)$ and a color measurement value $(L^*_{i,j,k}, a^*_{i,j,k}, b^*_{i,j,k})$ is represented by $P_{i,j,k}$. Note that each of i, j, and k is an index indicating an RGB value corresponding to the grid point divided in step S401, and its value ranges from 1 to N.

Figure 6:
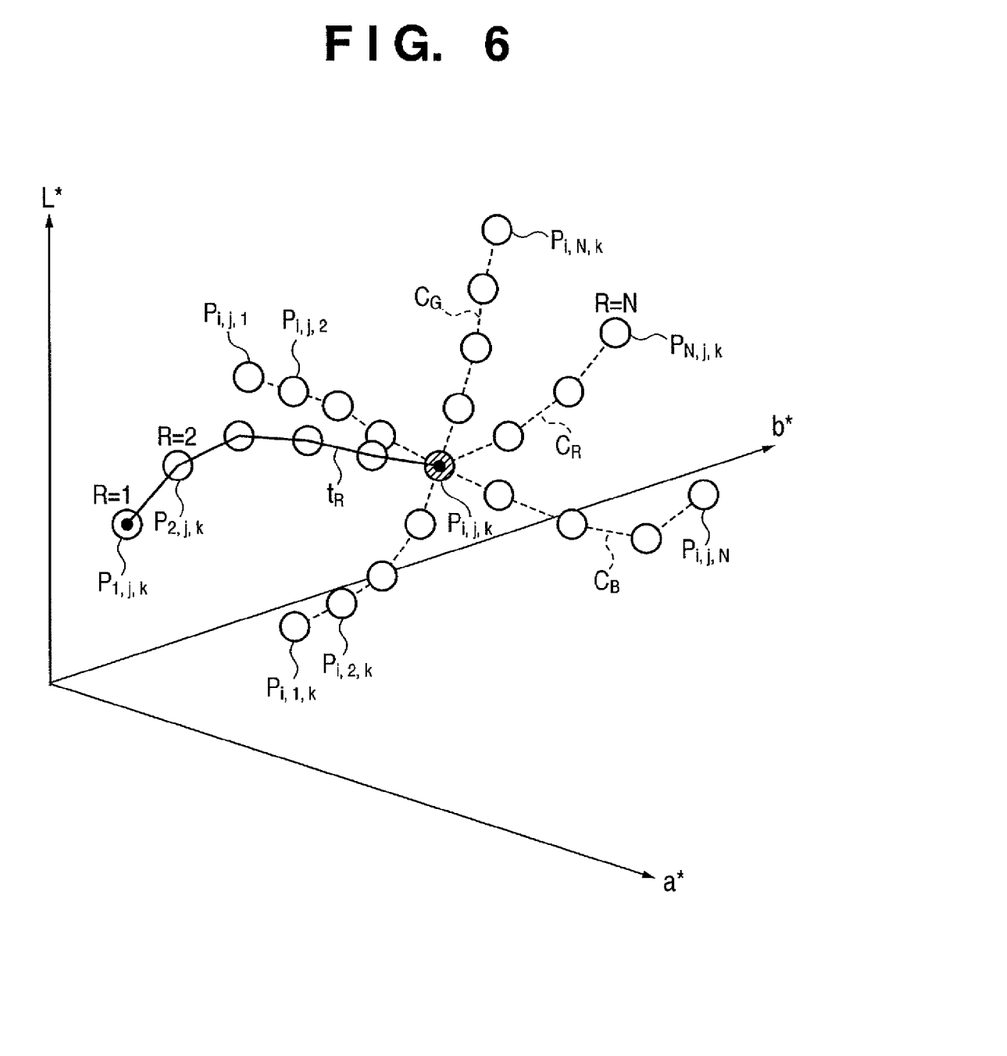
FIG. 6 is a view for explaining a curvature calculation method in the embodiment.

In this case, for the three curves passing through point $P_{i,j,k}$ shown in FIG. 6, curvatures $X^R_{i,j,k}$, $X^G_{i,j,k}$, and $X^B_{i,j,k}$ at point $P_{i,j,k}$ in the L*a*b* space are calculated, respectively. The three curves passing through point $P_{i,j,k}$ are curves $C_R$, $C_G$, and $C_B$. Curve $C_R$ connects a sequence of points $P_{1,j,k}$, $P_{2,j,k}$, ..., and $P_{N,j,k}$ which extend in the R axis direction. Curve $C_G$ connects a sequence of points $P_{i,1,k}$, $P_{i,2,k}$, ..., and $P_{i,N,k}$ which extend in the G axis direction. Curve $C_B$ connects a sequence of points $P_{i,j,1}$, $P_{i,j,2}$, ..., and $P_{i,j,N}$ which extend in the B axis direction.

For example, in case of $X^R_{i,j,k}$, a curvature calculation formula in this embodiment is expressed by:

$$X^R_{i,j,k} = \left\| \frac{d^2}{dt_R^2}(L^*_{i,j,k}, a^*_{i,j,k}, b^*_{i,j,k}) \right\| \quad (1)$$

where $t_R$ represents the distance from point $P_{1,j,k}$ to point $P_{i,j,k}$ along curve $C_R$ on the L*a*b* space.

$X^G_{i,j,k}$ and $X^B_{i,j,k}$ are calculated in the same manner as $X^R_{i,j,k}$. Note that since the curvature need only indicate the bending degree of each of curves $C_R$, $C_G$, and $C_B$ in the L*a*b* space, it may be calculated not using equation (1) but using:

$$X^R_{i,j,k} = \frac{\overline{P_{i+1,j,k}P_{i,j,k}} + \overline{P_{i,j,k}P_{i-1,j,k}}}{\overline{P_{i+1,j,k}P_{i-1,j,k}}} \quad \text{for} \quad (2)$$

$$\overline{P_{i,j,k}P_{i',j',k'}} = \sqrt{(L^*_{i',j',k'} - L^*_{i,j,k})^2 + (a^*_{i',j',k'} - a^*_{i,j,k})^2 + (b^*_{i',j',k'} - b^*_{i,j,k})^2} \quad (3)$$

The curvatures calculated in step S404 are stored in the RAM 305 or HD 308.

The processing in step S404 described above corresponds to the processing in the feature amount calculation unit 102.

In step S405, for the patch signal values stored in step S401, a tone evaluation value is calculated using the curvatures calculated in step S404. A tone evaluation value in this embodiment is the average value of the curvatures calculated by:

$$\text{Tone evaluation value } 1 = \frac{\alpha}{3}(X^R_{i,j,k} + X^G_{i,j,k} + X^B_{i,j,k}) \quad (4)$$

where α is a coefficient defined based on the gamut size of the LUT or the division count determined in step S401. The calculated tone evaluation value is stored in the RAM 305 or HD 308.

In this embodiment, when the tone evaluation value is calculated as described above, a portion in which the curvature largely varies is extracted as a tone jump position.

More specifically, in step S406, a neighboring variation as the variation of the LUT feature amount is calculated between the neighboring grid points in the first color space stored in step S401.

That is, as the neighboring variation, the variation of the curvature calculated in step S404 is calculated, for example, by using:

$$\Delta X^R_{i,j,k} = \frac{d}{dt_R} X^R_{i,j,k} \quad (5)$$

In step S407, a position in which the sign of the variation $\Delta X^R_{i,j,k}$ of the curvature calculated in step S406 changes from plus to minus or vice versa between the two neighboring points is extracted as a tone jump position.

For example, when $\Delta X^R_{i,j,k} > 0$ and $\Delta X^R_{i+1,j,k} < 0$, point $P_{i,j,k}$ and point $P_{i+1,j,k}$ are extracted as a tone jump position.

Note that the R axis direction is exemplified in this embodiment, but the tone jump positions are extracted in the G axis direction and B axis direction by the same method as for the R axis direction. The extracted tone jump positions are stored in the RAM 305 or HD 308.

The processing in steps S405 to S407 described above corresponds to the processing in the conversion table tone evaluation value calculation unit 103.

In step S408, the tone evaluation value calculated in step S405 and the tone jump position extracted in step S407 are output to the display 203 to notify the user of them.

As has been described above, according to this embodiment, it becomes possible to appropriately evaluate tone reproduction by the color conversion table for the entire gamut reproducible by a color printer. In addition, the tone jump position on the color conversion table can be effectively specified.

Second Embodiment

The second embodiment according to the present invention will be described below.

Tone evaluation in the first embodiment described above is performed locally in which evaluation values are calculated for the respective signal values of a patch and then a tone jump position is specified. The present invention is not limited to this, and an evaluation value may be calculated for an entire LUT. In the first embodiment, when acquiring color information a patch, a color measurement value acquired by measuring the color of the patch output by a printer is input as the color information. However, as for color information, the color information need only reflect the conversion content by the color conversion table. Accordingly, output and color measurement of the patch are not always necessary. For example, a value converted by the color conversion table may be acquired by a computer simulation. The second embodiment is characterized by calculating an evaluation value for an entire LUT on the basis of color information acquired by a computer simulation.

Figure 7:
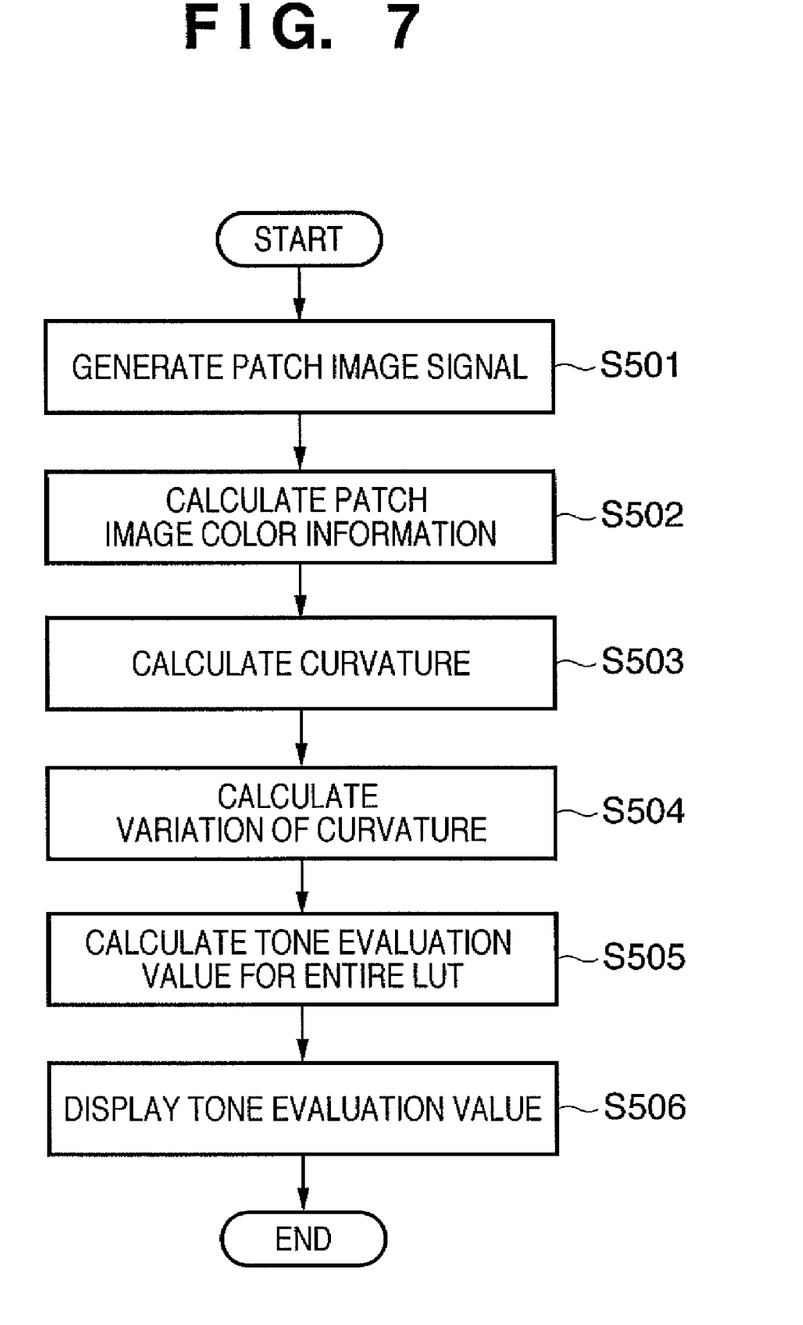
FIG. 7 is a flowchart showing a tone evaluation process in the second embodiment.

A tone evaluation process in a tone evaluation system of the second embodiment will be described below with reference to the flowchart in FIG. 7. Note that the configuration of the system in the second embodiment is the same as in the first embodiment described above, and a description will not be repeated.

In step S501, R, G, and B as the components of the first color space are respectively divided with a given number of steps to generate the signal values of a patch image. Since the specific division method is the same as that shown in step S401 in the first embodiment described above, it will not be described in detail.

The determined gird points and the signal values of the respective patches are stored in an RAM 305, an HD 308, or the like.

In step S502, on the basis of the respective patch signal values generated in step S501, the corresponding L*a*b* values as the components of the second color space are calculated as color information by a computer simulation. In this embodiment, a computer simulation is a process for calculating, for the patch signal values generated in step S501, the signal values on the second color space converted via the color conversion table. The calculated color information of the respective patches is associated with the respective patch signal values stored in step S501 and stored in the RAM 305 or HD 308.

In step S503, curvatures as the feature amount of an LUT are calculated for all the patch signal values stored in step S501 on the basis of the corresponding color information stored in step S502. Since the specific curvature calculation method is the same as that in step S404 described in the first embodiment described above, it will not be described in detail.

The process advances to step S504 and, as in step S406 in the first embodiment described above, the variation of the curvature between the neighboring grid points is calculated.

In step S505, a tone evaluation value for the entire LUT is calculated. As the tone evaluation value in the second embodiment, the absolute sum of the variations of the curvatures is applicable which is calculated by:

$$\text{Tone evaluation value } 2 = \beta \sum_{i=1}^{N}\sum_{j=1}^{N}\sum_{k=1}^{N}(|\Delta X_{i,j,k}^{R}| + |\Delta X_{i,j,k}^{G}| + |\Delta X_{i,j,k}^{B}|) \quad (6)$$

Note that since the tone evaluation value in the second embodiment need only indicate the degree of variation of the curvature, it may be calculated using, instead of equation (6), variance sums and:

$$\text{Tone evaluation value } 3 = \gamma\left(\sum_{j=1}^{N}\sum_{k=1}^{N}\sigma_{j,k}^{R} + \sum_{k=1}^{N}\sum_{i=1}^{N}\sigma_{k,i}^{G} + \sum_{i=1}^{N}\sum_{j=1}^{N}\sigma_{i,j}^{B}\right) \quad (7)$$

where each of $\sigma_{j,k}^{R}$, $\sigma_{k,i}^{G}$, and $\sigma_{i,j}^{B}$ represents the variance of the curvature on each of curves $C_R$, $C_G$, and $C_B$. Note that β in equation (6) and γ in equation (7) are coefficients defined based on the gamut size of the LUT or the number of steps determined in step S501. The calculated tone evaluation value is stored in the RAM 305 or HD 308.

In step S506, the tone evaluation value calculated in step S505 is output to a display 203 to notify the user of it.

In the second embodiment, as in the first embodiment described above, a tone jump position may be extracted after step S505 and the user may be notified of it as well.

As has been described above, according to the second embodiment, the tone in the entire gamut reproducible by a color printer can be generally evaluated by an easy method without any patch output or color measurement.

Third Embodiment

The third embodiment according to the present invention will be described below.

In the tone evaluation in the first and second embodiments described above, an evaluation value for the LUT is calculated. The present invention is not limited to this. The third embodiment is characterized by calculating an evaluation value for an image output by using an LUT.

Figure 8:
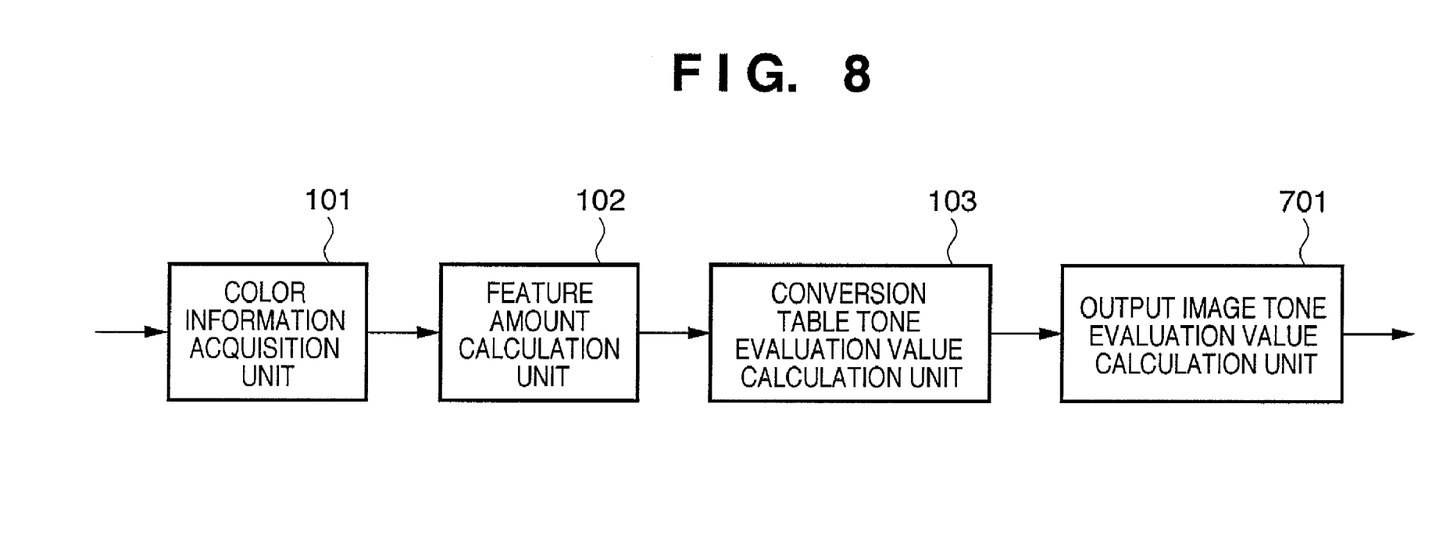
FIG. 8 is a block diagram showing an outline of the functional arrangement of a tone evaluation system in the third embodiment.

FIG. 8 is a view showing an outline of the functional arrangement of a tone evaluation system of the third embodiment. In FIG. 8, the same components as those in FIG. 2 shown in the first embodiment described above are denoted by the same reference numerals, and a description will not be repeated. In FIG. 8, reference numeral 701 denotes an output image tone evaluation value calculation unit which inputs the resolution of an output image and calculates the tone evaluation value in the output image on the basis of the input resolution and the tone evaluation value of an LUT calculated by a conversion table tone evaluation value calculation unit 103.

Figure 9:
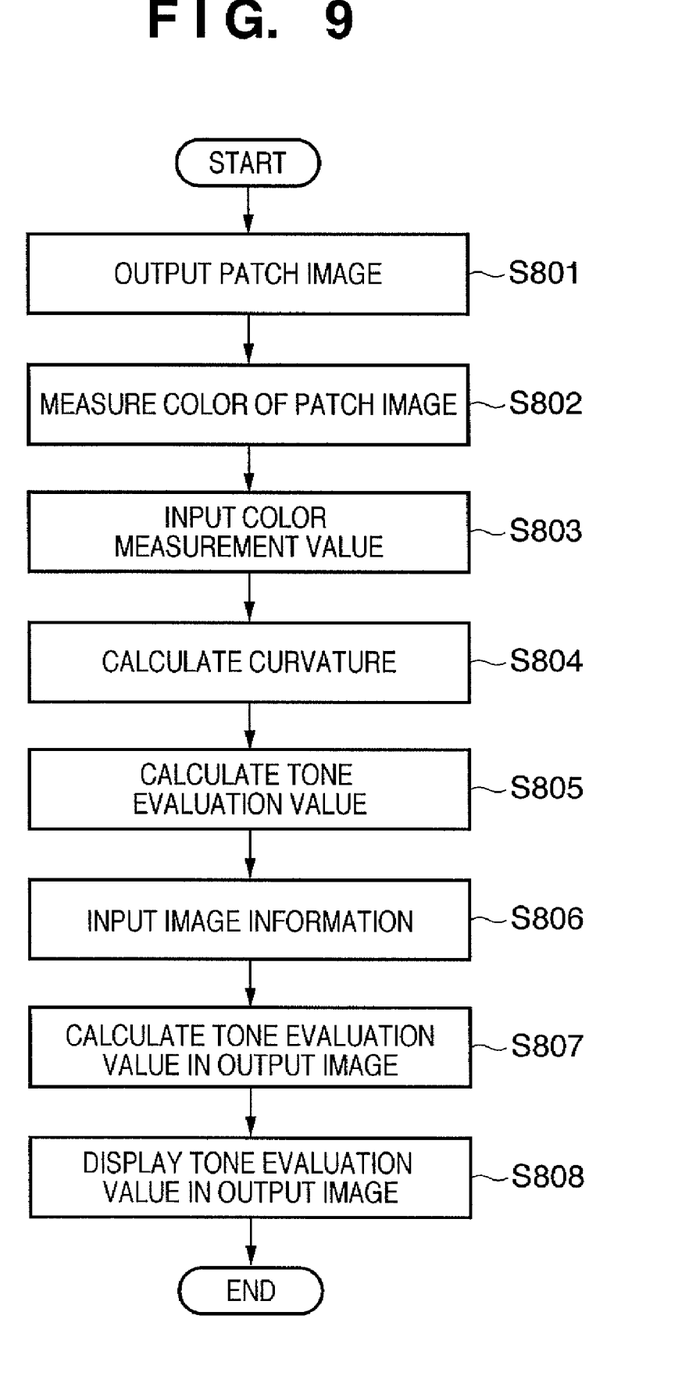
FIG. 9 is a flowchart showing a tone evaluation process in the third embodiment.

A tone evaluation process in the tone evaluation system of the third embodiment will be described below with reference to the flowchart in FIG. 9.

Figure 5:
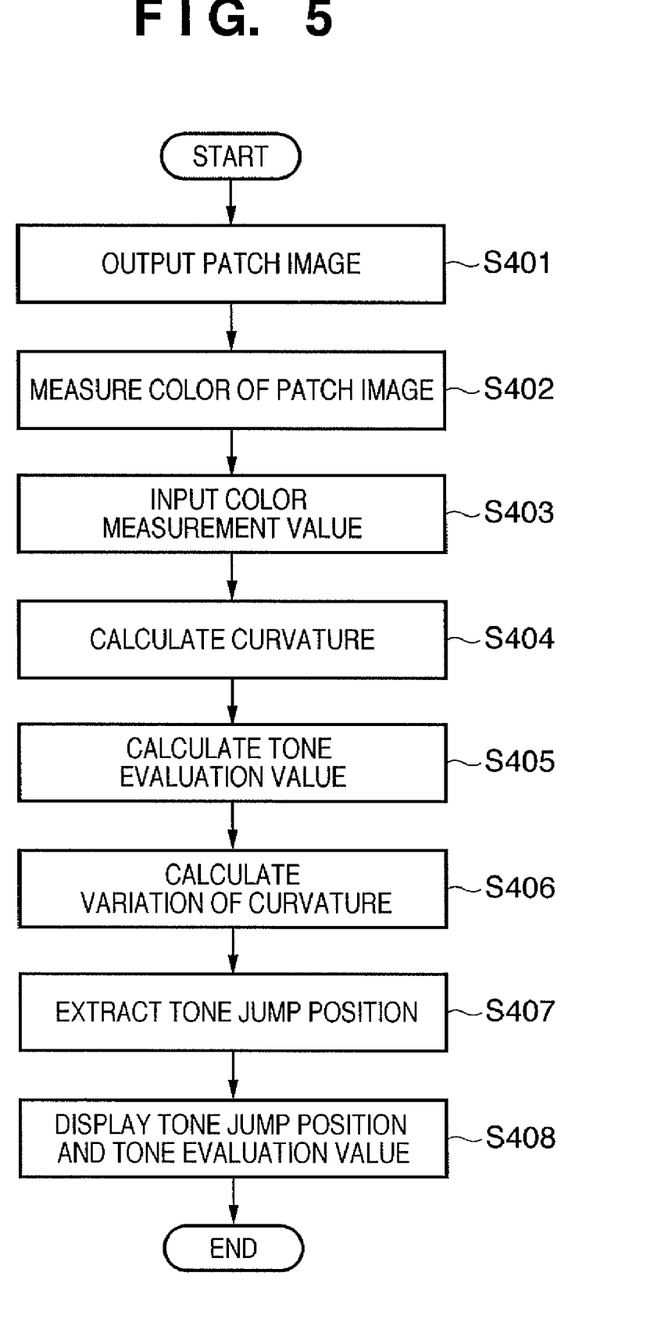
FIG. 5 is a flowchart showing a tone evaluation process in the embodiment.

The processing in steps S801 to S805 is the same as that in steps S401 to S405 shown in FIG. 5 in the first embodiment described above, and a description will not be repeated.

Figure 10:
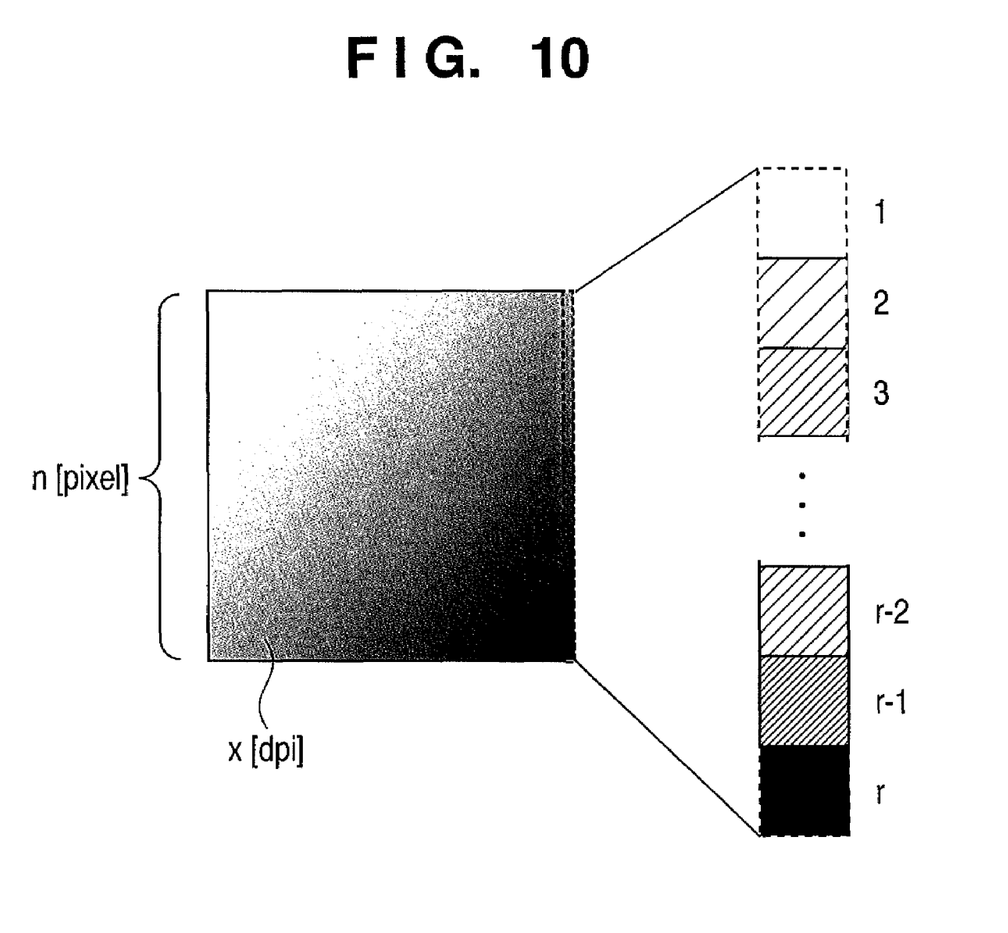
FIG. 10 is a view illustrating an example of an image to be evaluated in the third embodiment.

In step S806, image information of an output target as a tone evaluation target is input. In the third embodiment, the image as a tone evaluation target is an image output on a printing medium. For example, when an evaluation target image is the gradation image shown in FIG. 10, a resolution x [dpi], a size n [pixel], and the number of gray levels s of this gradation image are input as output target image information. The input image information is stored in an RAM 305 or HD 308.

In step S807, the tone evaluation value of the output image is calculated by using the tone evaluation value of the color conversion table calculated in step S805 and the image information stored in step S806. More specifically, the output image size on an actual paper sheet is calculated from the resolution x and size n of the image stored in step S806. Then, the spatial frequency of the output image is calculated from the calculated output image size and the number of gray levels s of the image stored in step S806. The spatial frequency characteristic of human vision corresponding to the acquired spatial frequency is multiplied by the tone evaluation value of the color conversion table calculated in step S805, and the acquired value is set as the tone evaluation value of the output image. The calculated tone evaluation value of the output image is stored in the RAM 305 or HD 308.

In step S808, the tone evaluation value of the output image calculated in step S807 is output to a display 203 to notify the user of it. At this time, the tone evaluation value calculated in step S805 may be notified as well.

In the third embodiment, as in the first embodiment described above, a tone jump position may be extracted after step S805 and the user may be notified of it as well.

As has been described above, according to the third embodiment, the tone in the entire gamut reproducible by a color printer can be appropriately evaluated for an output image.

Other Embodiments

The preferred embodiments have been described above in detail. However, the present invention can include an embodiment of, for example, a system, apparatus, method, program, storage medium (recording medium), or the like. More specifically, the present invention may be applied to a system made up of a plurality of devices (e.g., host computer, interface device, image sensing device, web application), or an apparatus formed from one device.

The present invention can be implemented by supplying a software program which implements the functions of the foregoing embodiments, directly or indirectly to a system or apparatus, reading the supplied program code with a computer of the system or apparatus, and then executing the program code. In this case, the program is of course a computer-readable program and corresponds to the flowcharts shown in the drawings according to the embodiments.

Accordingly, the program code installed in the computer in order to implement the functional processing of the present invention by the computer also implements the present invention. In other words, the present invention also includes a computer program itself for the purpose of implementing the functional processing of the present invention.

In this case, the program may take the form of an object code, a program executed by an interpreter, or script data supplied to an OS as long as the functions of the program are provided.

Examples of recording media that can be used for supplying the program are a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (DVD-ROM and DVD-R).

As for the method of supplying the program, a client computer can be connected to a homepage on the Internet using a browser of the client computer, and the computer program of the present invention (or an automatically-installable compressed file of the program) can be downloaded from the homepage to a recording medium such as a hard disk. Further, the program of the present invention can be supplied by dividing the program code constituting the program into a plurality of files and downloading the files from different homepages. In other words, a WWW server that downloads, to multiple users, the program files that implement the functional processing of the present invention by the computer is also included in the present invention.

It is also possible to encrypt and store the program of the present invention on a storage medium such as a CD-ROM, distribute the storage medium to users, and allow users who meet certain requirements to download decryption key information from a homepage via the Internet. These users can decrypt the encrypted program by using the key information and install the program in the user computer.

The aforementioned functions according to the embodiment are implemented by executing the read program by computer. Furthermore, an OS or the like running on the computer may perform all or a part of the actual processing on the basis of an instruction of the program so that the functions of the foregoing embodiment can be implemented by this processing.

Furthermore, the functions of the foregoing embodiment are also implemented when the program read from the recording medium is written in a function expansion board inserted into the computer or in a memory provided in a function expansion unit connected to the computer and the program is executed. More specifically, a CPU or the like mounted on the function expansion board or function expansion unit can perform all or a part of the actual processing on the basis of an instruction of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-93415, filed Mar. 30, 2007, which is hereby incorporated by reference herein in its entirety.

What is claimed is:

1. A tone evaluation apparatus which evaluates a tone reproduced using a color conversion table for converting image data on a first color space into image data on a second color space, the apparatus comprising:
    an acquisition unit adapted to acquire color information on the second color space for each of a plurality of grid points in the first color space;
    a calculation unit adapted to calculate a tone evaluation value for the color conversion table on the basis of a variation of curvature indicating a bending degree of a curve of the color information between the grid points in the first color space; and an evaluation unit adapted to evaluate a tone, reproduced using the color conversion table, on the basis of the tone evaluation value.

2. The apparatus according to claim 1, wherein the calculation unit calculates the variation of curvature as a feature amount of the overall plurality of grid points which compose the color conversion table and calculates a tone evaluation value for the color conversion table on the basis of the feature amount.

3. The apparatus according to claim 1, further comprising a notification unit adapted to display the tone evaluation value.

4. The apparatus according to claim 1, wherein the acquisition unit acquires as the color information a color measurement value on the second color space which is acquired by measuring colors of a plurality of patch images corresponding to grid points acquired by dividing the first color space in a grid pattern.

5. The apparatus according to claim 1, wherein the calculation unit calculates as the tone evaluation value an average value of curvatures of respective components forming the first color space.

6. The apparatus according to claim 1, wherein the calculation unit calculates as the tone evaluation value an absolute sum of variations of curvatures between the neighboring grid points in the first color space.

7. The apparatus according to claim 1, wherein the calculation unit calculates as the tone evaluation value a variance sum of curvatures of the respective components forming the first color space.

8. The apparatus according to claim 1, further comprising:
a neighboring variation calculation unit adapted to calculate as a neighboring variation a variation of the curvature of the color information between the neighboring grid points in the first color space; and
an extraction unit adapted to extract a tone jump position in the color conversion table on the basis of the neighboring variation.

9. The apparatus according to claim 8, wherein the extraction unit extracts as a tone jump position a grid point having a neighboring variation with sign inversion.

10. The apparatus according to claim 1, wherein the acquisition unit comprises:
a generation unit adapted to generate image signals of a plurality of patch images corresponding to grid points acquired by dividing the first color space in a grid pattern; and
a color information calculation unit adapted to calculate as the color information a signal value converted onto the second color space by the color conversion table, for the respective image signals of the plurality of patch images generated by the generation unit.

11. The apparatus according to claim 1, further comprising:
an input unit adapted to input image information to be output; and
an output image tone evaluation value calculation unit adapted to calculate, on the basis of the tone evaluation value, a tone evaluation value for the image information to be output.

12. A tone evaluation method of evaluating a tone reproduced using a color conversion table for converting image data on a first color space into image data on a second color space, the method comprising:
an acquisition step in which a color information acquisition unit acquires color information on the second color space for each of a plurality of grid points in the first color space;
a calculation step in which a tone evaluation value calculation unit calculates a tone evaluation value for the color conversion table on the basis of a variation of curvature indicating a bending degree of a curve of the color information between the two grid points in the first color space; and
an evaluation step of evaluating a tone, reproduced using the color conversion table, on the basis of the tone evaluation value.

13. A computer-readable recording medium recording a computer program for causing a computer to function as the tone evaluation apparatus according to claim 1 when the program is executed on the computer.

* * * * *